Dec. 24, 1929.　　H. E. SCHMEDLEN　　1,740,908
FISHING POLE
Filed July 5, 1928
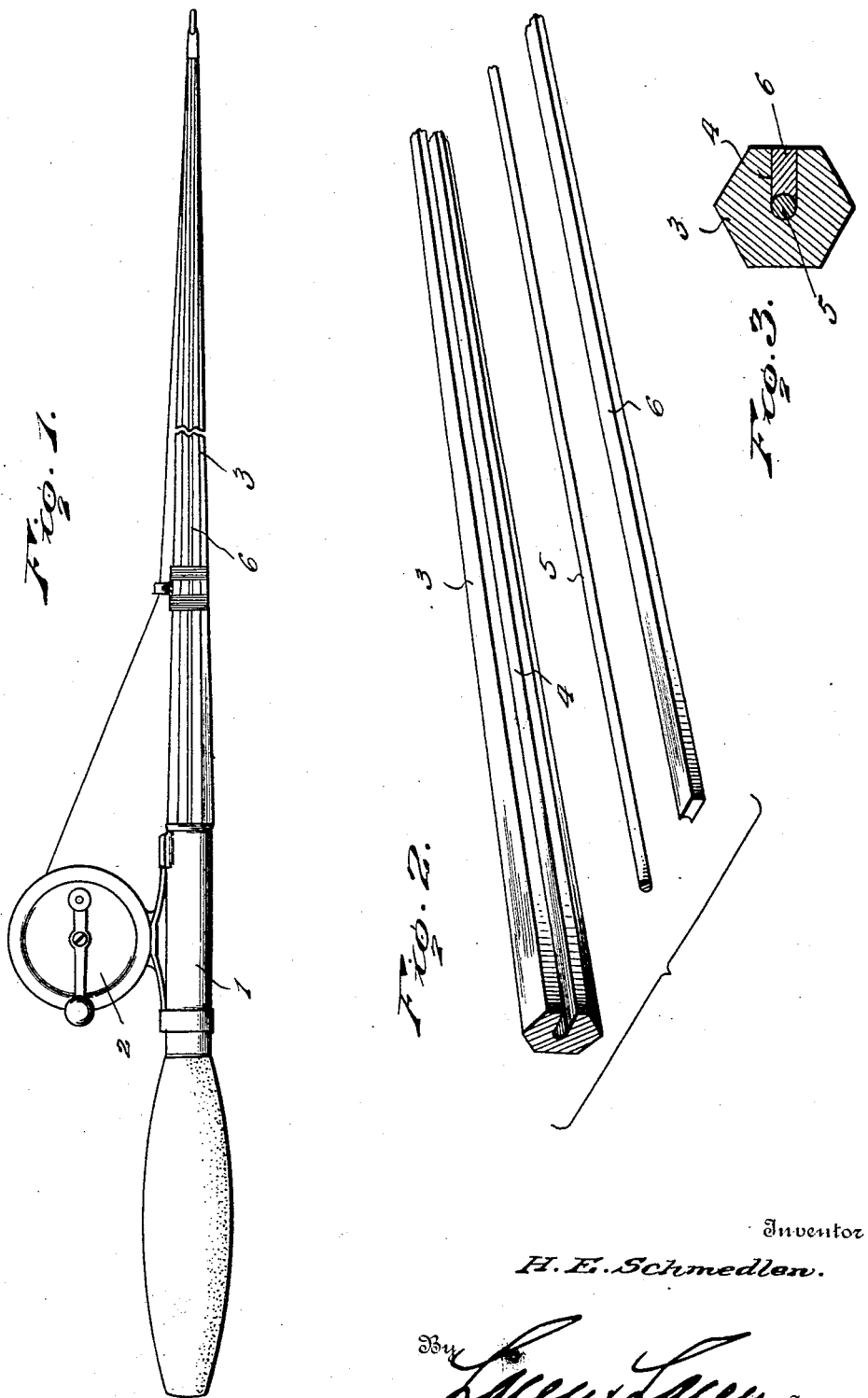
Inventor
H. E. Schmedlen.
By Lacey & Lacey, Attorneys Patented Dec. 24, 1929

1,740,908

UNITED STATES PATENT OFFICE

HENRY E. SCHMEDLEN, OF COLDWATER, MICHIGAN

FISHING POLE

Application filed July 5, 1928. Serial No. 290,586.

This invention relates to fishing and trapping and more particularly to a fishing pole of the type employed with a line and reel.

At the present time fishing rods or poles consist either of metal or wood and it has been found that, when a fishing rod is formed of wood, it is liable to become warped after being used for some time and in addition it is liable to be broken if a large fish is caught and the rod subjected to excessive strain when the fish endeavors to escape.

Therefore, one object of the invention is to provide a fishing pole which will be reinforced by a resilient metal rod extending longitudinally in the pole and thereby prevent the pole from being easily broken or warped.

Another object of the invention is to allow the reinforcing rod to be set into the body of the pole without materially weakening the pole.

Another object of the invention is to so set the rod in the body portion of the pole that it will be completely covered and thereby prevented from being exposed and subjected to danger of rusting.

Another object of the invention is to provide a reinforced fishing pole which will be very strong and durable and can be very cheaply produced.

The invention is illustrated in the accompanying drawing, wherein

Figure 1 is a view showing the improved fishing pole in side elevation;

Fig. 2 is a perspective view showing the body portion of a pole section together with its reinforcing rod and a filler strip for the groove in which the rod is seated, and Fig. 3 is a transverse sectional view through the improved pole.

The improved fishing pole consists of the usual handle section 1 to which the reel 2 is applied and one or more pole sections 3 which may be of any length desired and if more than one is used coupled in a conventional manner. The pole section which may be of any shape desired in cross section is formed of wood and is cut to define a longitudinally extending groove 4 which opens through a side of the pole section and is cut radially thereof, as shown in Fig. 3. A reinforcing rod 5 is formed of resilient metal, such as steel or the like, and is preferably circular in cross section although rods of other cross sectional shape may be employed. It will also be obvious that the reinforcing rod may be either solid or tubular. This reinforcing rod is set in the groove or seat 4 and when in place extends longitudinally of the pole section in axial relation thereto and as it is formed of resilient metal it will serve very effectively to prevent the pole section from warping and also prevent it from being broken if a large fish is caught. The filler 6 which covers the reinforcing rod and retains it in place in the seat or groove 4 is also formed of wood and is of such thickness that it fits tightly into the groove. The inner edge of the filler conforms to the contour of the reinforcing rod so that when the filler is in place it will have close contacting engagement with the reinforcing rod, as shown in Fig. 3, and firmly hold it in place.

When making the fishing pole, the pole section is first cut the desired length and shape to assume the desired cross section after which the groove 4 will be formed or the groove may be formed in the pole section before it is shaped in cross section. After the groove has been formed, the rod 5 to which adhesive, such as glue or the like, has been applied is set in place and adhesive is then applied to the side faces and inner edge of the filler and this filler is fitted into place. After the glue has partly dried any portion of the filler which projects outwardly from the rod section is removed by a plane or other suitable implement until its outer edge is flush with the surface of the pole and the pole can then be stained and varnished in the usual manner. If the desired cross sectional shape is imparted to the pole section after the filler has been set in place any portion of the filler which projects from the seat when it is initially applied will be removed during the shaping process. It will thus be seen that I have provided a fishing pole which will be very strong and durable and not liable to easily warp or break.

Having thus described the invention, I claim:

1. A fishing pole comprising an elongated body section formed with a longitudinally extending groove cut diametrically thereof with its bottom extending axially of the section, a resilient reinforcing rod disposed within the groove and extending axially of the section, and a filler fitted into the groove and firmly secured to retain the rod in place, the outer face of the filler being flush with the surface of the section.

2. A fishing pole comprising an elongated body section formed with a longitudinally extending groove cut diametrically thereof with its bottom extending axially of the section, a resilient reinforcing rod disposed within the groove and extending axially of the section, and a filler strip fitting snugly into said groove and firmly secured therein with its inner face snugly engaging the rod and its outer face flush with the surface of the body section.

3. A fishing pole comprising an elongated body section formed with a longitudinally extending groove opening through a side of the body section, a reinforcement for the section seated in said groove, and a filler secured in said groove and retaining the reinforcement in place.

4. A fishing pole comprising an elongated body section formed with a longitudinally extending groove opening through a side of the body section, a resilient reinforcing rod for the body section seated in said groove and extending longitudinally of the section, and means to retain the reinforcing rod in place.

5. A fishing pole comprising an elongated body section formed with a longitudinally extending groove opening through a side of the body section, a resilient reinforcing rod for the body section seated in said groove and extending longitudinally of the section, and common means to retain the rod in place and fill the groove between the rod and open side of the groove.

In testimony whereof I affix my signature.

HENRY E. SCHMEDLEN. [L. S.]